United States Patent Office 3,531,466
Patented Sept. 29, 1970

3,531,466
PROCESS FOR THE PRODUCTION OF
IMINOSTILBENE
Helmut Beschke, Heerstrasse 148, Frankfurt am Main,
Germany, and Wilhelm Alfons Schuler, Am Elisabethenbrunnen 17, Bad Homburg, vor der Hohe, Germany
No Drawing. Filed May 4, 1966, Ser. No. 547,424
Claims priority, application Germany, May 14, 1965,
D 47,262
Int. Cl. C07d 41/08
U.S. Cl. 260—239                                           13 Claims

ABSTRACT OF THE DISCLOSURE

Iminostilbene is produced from iminodibenzyl vapor in a conversion of at least 60% and in yields of at least 60% by heating at 300 to 700° C. with a dehydrogenation catalyst containing at least one non-noble metal of the transition elements. Preferably, the catalyst is employed on a non-metallic carrier of 10 to 500 m.$^2$/g.

---

The present invention relates to an improved process for the production of iminostilbene (5H-dibenzyl-(b,f)-azepine) and more particularly relates to an improved catalytic dehydrogenation of iminodibenzyl (10,11-dihydro-5H-dibenzo-(b,f)-azepine) whereby a higher conversion and a better yield of iminostilbene are obtained.

According to U.S. Pat. 3,074,931 and J. Org. Chem. 26, pages 136–138, iminostilbene can be produced by the catalytic dehydrogenation of iminodibenzyl. Sulfur, selenium and particularly noble metals in elemental form have been indicated as suitable catalysts for such dehydrogenation. For instance, such dehydrogenation is carried out at low temperatures within a narrow range, for example, for palladium-carbon, at 160–170° C. According to such process about 20–30% of the iminodibenzyl is converted. The reaction mixture is separated into three fractions in a chromatographic column. One of such fractions is practically pure iminostilbene, and iminostilbene also can be isolated from the second fraction by recrystallization from ethanol. The remainder of the second fraction and the third fraction which practically only consists of iminodibenzyl are then again subjected to dehydrogenation. By repeated operation total yield of 50% of theory is attained, the other 50% represents loss of material.

According to the invention it was found that substantially higher conversions and substantially better yields of iminostilbene can be attained by the catalytic dehydrogenation of iminodibenzyl when non-noble metals of the transition elements are employed as catalysts either in elemental form or in the form of their oxides or salts at temperatures of 300–700° C. Examples of transition metals which come into consideration as the catalyst for instance are iron, cobalt, nickel, copper, zinc, chromium, molybdenum, vanadium and tungsten. Iron, nickel, cobalt, vanadium, chromium and zinc are well suited as catalysts, of which iron, nickel, cobalt and chromium have proved especially suitable.

The metals can be used as such, as alloy skeleton catalysts, such as, in Raney nickel or cobalt, as oxides or as salts. The oxides and salts can be used singly or in admixture. The non-noble metal catalytic materials employed according to the invention can be applied to carriers and, particularly, if per se, they do not provide for a sufficient surface area they can be applied to carriers in such a way that a sufficient surface area is provided. For example, the catalytic salts of the non-noble transition metals, such as, for instance, potassium chromate can be applied as an aqueous solution to a powdery carrier, such as, silica gel. After drying, the treated silica gel can be employed directly as the dehydrogenation catalyst. The powdery carriers which preferably are employed in conjunction with the non-noble transition metal catalytic material when in elemental oxide or salt form of low surface area preferably have a specific surface area of about 10 to 500 m.$^2$/g. The catalytic oxide employed according to the invention, preferably, when employed in unsupported form, have a specific surface area of about 2–200 m.$^2$/g.

A temperature within the range of 380 to 620° C. is especially advantageous for the dehydrogenation according to the invention.

Conversions of dibenzyl of 60 to 100% and yields of 60 to 95% of theory of iminostilbene can be obtained in a single pass with the process according to the invention.

The process according to the invention provides the advantage that the non-noble transition metal catalysts employed give substantially higher yields in a single pass than the noble metal catalysts of U.S. Pat. 3,074,931 without requiring additional fractionation and processing. In addition, the stability of the reaction products is considerably less endangered by the non-aggressive non-noble metal catalysts than by the aggressive noble metal catalysts, so that a danger that the iminostilbene produced is decomposed catalytically is out of the question. The product produced is stable even at higher temperatures in the presence of the catalysts used according to the invention. In addition the dehydrogenation according to the invention, as compared to dehydrogenation with noble metal catalysts, can be carried out in a wide range of temperatures. Furthermore, the catalysts according to the invention are very sturdy and can be used many times without loss of activity.

The dehydrogenation can be carried out at atmospheric pressure as well as at subatmospheric pressures. Expediently, however, pressures between 0.1 and 10 torr, preferably, between 0.2 and 2.0 torr are employed.

The dehydrogenation can be carried out in a known manner in reaction tubes. The catalysts can be used in known forms as powders, pressed tablets, extruded cylinders or as rings. In the case of powdered catalysts, known materials, such as, kieselguhr, aluminum oxide, silicon dioxide or asbestos can be used as carriers. Inert carriers, such as, glass, porcelain or glass wool can also be used. The powdered catalysts also can be used in the form of a fluidized bed.

In order to adjust the pressure of the iminodibenzyl dehydrogenated according to the invention, it is possible to heat the iminodibenzyl under reflux and gradually pass the vapors thereof through the reaction tube. However, it may be advisable for the uniform progress of the reaction to pass an inert gas, such as, nitrogen through the apparatus to provide the desired low pressure (partial-pressure) of the iminodibenzyl. A correspondly low partial pressure of the iminodibenzyl can also be achieved by dehydrogenating at atmospheric pressure in the presence of an excess of steam.

Subsequent to the dehydrogenation the gaseous reaction mixture is collected in a cooled receiving vessel and the iminostilbene recovered from the reddish yellow crystalline reaction mixture obtained upon cooling by recrystallization from an inert solvent, such as, an aromatic hydrocarbon. Xylene has proved especially adapted as solvent. 95% of the iminostilbene produced can be directly recovered at a purity of 99 to 100% by a single recrystallization from xylene. The remaining solvent solution which contains any iminodibenzyl which may eventually not have been converted to iminostilbene in addition to the small remainder of iminostilbene can be boiled down under vacuum and the residue employed for a second dehydrogenation.

The iminostilbene produced according to the invention has valuable technical properties, for example, it can be used as an antioxidant or stabilizer in synthetic resins and in addition it is a valuable starting material for the production of pharmaceuticals.

The following examples will serve to illustrate the process according to the invention with reference to several embodiments thereof. In such examples the proportions are given by weight unless specified otherwise.

EXAMPLE 1

An upright reaction tube 50 cm. long with an interior diameter of 3 cm. was filled with porcelain Raschig rings upon which 10 parts of an active nickel catalyst supported on kieselguhr (with 65% nickel and a surface area of 97 m.$^2$/g.) were distributed. A 2-necked flask provided with a feed of nitrogen was connected to the bottom of the reaction tube and a cooled receiving vessel connected to the top of such tube over a bridge. A vacuum pump was connected to such cooled receiving vessel. 20 parts of imidodibenzyl were placed in the 2-necked flask and heated to 150° C. while providing a pressure of about 0.2 torr therein. The reaction tube was preheated to 600° C. A weak stream of nitrogen was employed to pass uniform quantities of the vaporized iminodibenzyl through the reaction tube. The entire quantity of the iminodibenzyl has passed over into the reaction tube within 2 hours. The reaction mixture crystallized out in the receiving vessel in the form of orange yellow crystals. The yield of such reaction mixture was 17 parts. The loss of material therefore amounted to 3 parts. The product was recrystallized from 68 parts of xylene. 9.1 parts of iminostilbene with a melting point of 196° C. and a purity of 99.3% determined by gas chromatography were obtained. 7.9 parts of iminostilbene which was slightly contaminated with iminostilbene were recovered upon boiling down the xylene from which the iminostilbene had been recrystallized. Such recovered iminodibenzyl can be reused for the dehydrogenation. The conversion of the iminodibenzyl was about 12.1 parts or about 60.5% of the iminodibenzyl supplied. The 9.1 parts yield of iminostilbene represents a yield of 75% of theory in a single pass.

When the procedure described was repeated except that the reaction tube was heated to 500° C. instead of 600° C. the material loss was 3.8 parts and the iminostilbene and iminodibenzyl recovered 8.4 parts and 7.8 parts, respectively. The conversion therefore was 61% and the yield 69% of theory.

EXAMPLE 2

The apparatus described in Example 1 was employed and the reaction tube filled with an iron oxide catalyst in the form of extruded cylinders 3 mm. long with a surface area of 5 m.$^2$/g. instead of with the Raschig rings carrying the nickel catalyst. The reaction tube was heated to 400° C. 10 parts of iminodibenzyl which were placed in the 2-necked flask were distilled over into the reaction tube in a period of about 1½ hours at a pressure of about 0.4–0.6 torr by slowly heating the flask without supplying an inert gas stream thereto. 9.4 parts of reaction product of a melting point of 168–173° C. were obtained. 7.4 parts of iminostilbene with a melting point of 195° C. were recovered therefrom by a single recrystallization from 30 parts of xylene. 2.0 parts of iminodibenzyl were recovered from the mother liquor. The conversion therefore was 80% and the yield 92% of theory in a single pass.

EXAMPLE 3

The procedure of Example 2 was repeated using 5 parts of chromium oxide catalyst (Cr$_2$O$_3$ with 3% CrO$_3$; surface area 47 m.$^2$/g.) distributed on Raschigrings and a temperature of 450° C. 9.0 parts of reaction product were obtained, from which 7.46 parts of pure iminostilbene and 1.50 parts of crude iminodibenzyl were recovered. The conversion therefore was 85% and the yield 88% of theory in a single pass.

EXAMPLE 4

The procedure of Example 2 was repeated using the same iron oxide catalyst and apparatus except that it was carried out at atmospheric pressure and superheated steam was used to pass the vaporized iminodibenzyl through the reaction tube. 8.1 parts of reaction product were produced from 10 parts of iminodibenzyl. 5.1 parts of pure iminostilbene and 3 parts of crude iminodibenzyl were recovered therefrom. The conversion was 70% and the yield was 63% of theory in a single pass.

EXAMPLE 5

0.25 part of chromium (VI) oxide was dissolved in 5 parts of H$_2$O and the resulting solution mixed with 5 parts of finely divided silica (Ultrasil VN3) having a surface area of 240 m.$^2$/g. This mixture was distributed on Raschig rings and then dried. The procedure of Example 2 was followed with this catalyst. The conversion was 62% and the yield of iminostilbene was 86% of theory in a single pass.

EXAMPLE 6

When the procedure of Example 5 was repeated using 0.25 part of potassium dichromate instead of the chromium (VI) oxide, the conversion was 64% and the yield was 78% of theory in a single pass.

EXAMPLE 7

A horizontal reaction tube 120 cm. long having an inner diameter of 8 cm. was inserted in a horizontal tube furnace 110 cm. long having an inner diameter of 9 cm. The first 30 cm. of the reaction tube were provided with a Raschig ring filling. The remainder of the reaction tube was filled with a mixture of 120 parts of finely divided chromium oxide (Cr$_2$O$_3$ with 3% CrO$_3$; surface area 47 m.$^2$/g.). A cooled receiving flask was connected to the end of the reaction tube and such flask connected to a vacuum pump. The front end of the reaction tube was connected to an angle tube, filed with Rischig rings, which in turn was connected to a heatable dropping funnel provided with a pressure equalizing tube. The dropping funnel was filled with 250 parts of iminodibenzyl. Then a vacuum of about 2 torr was applied and the dropping funnel heated to 120° C. with the aid of a glycerine filled thermostat in order that the iminodibenzyl contained therein was liquefied. The angle tube was heated to about 200° C. in order that the iminodibenzyl dropped in was vaporized continuously.

The interior of the reaction tube was maintanied at 450–470° C. The iminodibenzyl was dropped into the angle tube at a rate of 10–12 drops per minute, at which rate about 12 hours were required to supply the 250 parts of iminodibenzyl to the reaction tube. The reaction product was collected in the receiver flask in the form of a moist crystalline mass. 233 parts of crude product were obtained from which 175 parts of pure iminostilbene were recovered by a single recrystallization from 950 parts of xylene. Such product was 100% pure as determined by gas chromatography and had a melting point of 196° C. The xylene mother liquor was evaporated down under vacuum and distilled. 31 parts of a mixture containing much iminostilbene and only a little iminodibenzyl distilled over at a pressure of 2 torr. A further 24 parts of iminostilbene of a melting point of 194° C. were recovered from such mixture by recrystallization from 120° cc. of xylene. The total yield of iminostilbene therefore amounted to 199 parts (79.6% of theory) with a practically 100% conversion.

EXAMPLE 8

The apparatus described in Example 1 was filled with a copper-chromite catalyst pressed to tablets 5 x 3 mm. having a surface area of 22 m.$^2$/g. After the reaction tube had been preheated to 390° C. 10 parts of iminodibenzyl were distilled into the reaction tube at a pressure of 0.4–0.6 torr over a period of about 1½ hours. Gas chromatographic investigation of the product indicated a 62.5% conversion of the iminodibenzyl and an iminostilbene yield of 65% of theory.

EXAMPLE 9

When the procedure of Example 3 was repeated using Raney cobalt instead of the cromium oxide as the catlyst the conversion of iminodibenzyl was 61% and the yield of iminostilbene 71% of theory.

EXAMPLE 10

When the procedure of Example 5 was repeated using 0.25 part of cobalt chloride instead of the chromium (VI) oxide as catalyst, the conversion of iminodibenzyl was 67% and the yield of iminostilbene 91% of theory.

EXAMPLE 11

When the procedure of Example 5 was repeated using 0.25 part of ammonium vandate instead of the cromium (VI) oxide as catalyst, the conversion of iminodibenzyl was 74% and the yield of iminostilbene 60.5% of theory.

We claim:

1. The method of producing iminostilbene which comprises contacting iminodibenzyl vapor with a dehydrogenation catalyst containing a non-noble metal selected from the group consisting of iron, cobalt, nicket, vanadium, chromium, zinc, molybdenum and tungsten in metallic form as the effective dehydrogenation catalyst component at a temperature between 300 and 700° C.

2. The method according to claim 1 wherein the non-noble metal is selected from the group consisting of iron, nickel and chromium.

3. The method according to claim 2 wherein the metal is supported on a non-metallic carrier having a surface area between 10 and 500 m.$^2$/g.

4. The method according to claim 2 wherein the dehydrogenation catalyst is in the form of an alloy skeleton catalyst.

5. The method according to claim 2 wherein the temperature at which the iminodibenzyl is contacted with the dehydrogenation catalyst is between 380 and 620° C. and a single pass is employed to convert at least 60% of the iminodibenzyl thereby and obtaining a yield of at least 60% of theory or iminostilbene.

6. The method according to claim 2 wherein the metal is nickel.

7. The method according to claim 2 wherein the metal is iron.

8. The method according to claim 2 wherein the metal is chromium.

9. The method of producing iminostilbene which comprises contacting iminodibenzyl vapor with a dehydrogenation catalyst consisting essentially of a chromium compound selected from the group consisting of chromium oxide and chromium salts as the effective dehydrogenation catalyst component at a temperature between 300 and 700° C.

10. The method according to claim 9 wherein the chromium compound is hexavalent chromium oxide.

11. The method according to claim 10 wherein the oxide has a surface area between 2 and 200 m.$^2$/g.

12. The method according to claim 11. wherein said chromium oxide dehydrogenation catalyst is supported on a powdered carrier having a surface area between 10 and 500 m.$^2$/g.

13. The method according to claim 9 wherein said chromium compound is in salt form and is supported on a powdered carrier having a surface area between 10 and 500 m.$^2$/g.

References Cited

UNITED STATES PATENTS

| | | | |
|---|---|---|---|
| 2,257,800 | 10/1941 | Howk | 252—472 |
| 2,341,995 | 2/1944 | Kipper | 252—472 |
| 2,488,560 | 11/1949 | Reitlinger | 252—472 |
| 2,599,978 | 6/1952 | Davis et al. | 252—472 |
| 3,449,324 | 6/1969 | Schramek et al. | 260—239 |

OTHER REFERENCES

Berkman et al., catalysis, (New York, 1940), pp. 657, 659, and 894.

ALTON D. ROLLINS, Primary Examiner